Patented Aug. 22, 1933

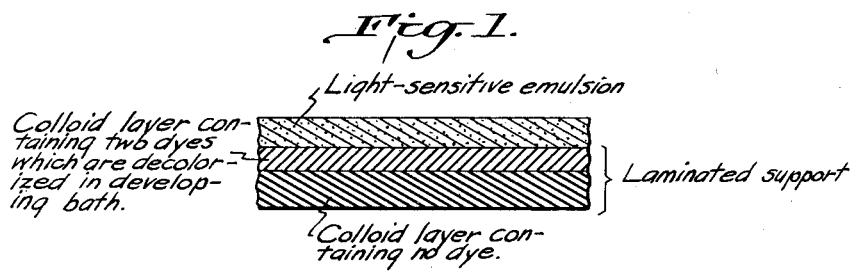
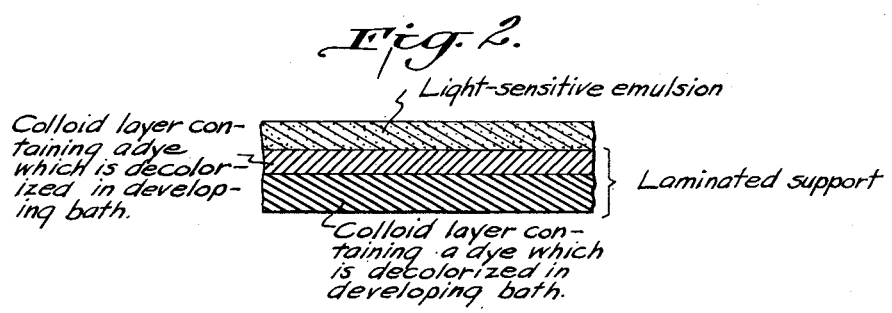
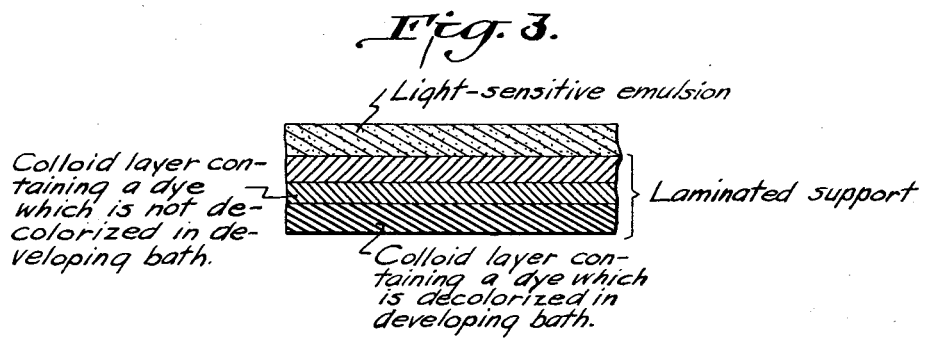

1,923,485

UNITED STATES PATENT OFFICE

1,923,485

ANTIHALATION LAYER AND HALATION-PROOF PHOTOGRAPHIC MATERIAL

Konrad Hebbel, Dessau-in-Anhalt, Germany, assignor to Agfa Ansco Corporation, Binghamton, N. Y., a Corporation of New York Application July 5, 1928, Serial No. 290,688, and in Germany July 16, 1927

6 Claims. (Cl. 95—8)

The present invention relates to antihalation layers for photographic sensitive materials and to photographic materials containing these antihalation layers. More particularly it relates to anti-halation layers colored by organic or inorganic dyestuffs.

I have found that anti-halation coatings, especially those for panchromatically sensitized materials, advantageously contain several dyestuffs which have certain spectral qualities with relation to each other. The photographic antihalation materials should have a laminated support composed of several individual layers. The halation-preventing dyes are distributed in one or several of these individual layers. The term "individual layers" is intended to include layers consisting of several different cellulose-derivatives, as well as intermediate layers or backing layers consisting of other colloids, as also an intermediate preparation-layer effecting the close assemblage of the sensitive layer and the support. In a laminated support which comprises e. g. a cellulose derivative layer, a substratum layer on one side and an antistatic layer on the other side thereof, the dyestuffs may be incorporated in any of the said layers. Dyestuffs which are to be incorporated in these colloid layers must be so selected that they are removed at least partly in the baths for normal treatment of the plate or film.

Since black dyestuffs in general can be separated from a colloid layer only with difficulty and incompletely, such dyestuffs are not suitable for the purpose. On the other hand, only black dyestuffs have the necessary property of cutting off the total radiation of the spectrum which is necessary for highly sensitive layers, particularly panchromatic layers. All other colored dyestuffs show one or two absorption gaps in the spectrum and are therefore not suitable for preventing halation in layers which are sensitized for all or most of the rays of the spectrum.

According to this invention excellent anti-halation coatings, particularly for panchromatic and reversal emulsions, are made by using simultaneously two or more dyestuffs for dyeing the anti-halation coating, the dyestuffs being selected in such a manner that a spectro-absorption gap of one corresponds with a maximum spectro-absorption of one or more other dyestuffs. A mixture of dyestuffs thus selected replaces completely the black anti-halation layers hitherto regarded as necessary for highly sensitive panchromatic emulsions and affords considerable advantage over the said black layers in that dyestuffs may be used which are easily decolorized when the plates or films are developed.

The anti-halation layers according to the present invention are colored and have for certain parts of the spectrum an absorption somewhat less than for the others. Nevertheless, they prevent when suitably selecting the dyes also in panchromatically sensitized emulsions any halation. This is due to the fact that the light rays, after having traversed the emulsion layer, enter the anti-halation layer, reach the rear side of the latter, and after reflection by the rear side re-pass the anti-halation layer. This double passage of the light rays through the anti-halation layer adds to the anti-halation effect. For this reason an anti-halation layer according to the present invention is sufficiently efficacious also for panchromatic emulsions though it does not quantitatively absorb the rays of the visible spectrum and is not sufficiently effective to protect the light sensitive layer against exposures from the rear side.

Within the scope of the invention are all organic and inorganic dyestuffs which fulfill the aforesaid conditions. They may be distributed either in one colloid layer or in several, and mixed or individually.

It is not necessary that each absorption gap of one dyestuff correspond with a maximum absorption of another. If, for example, one component is a red dyestuff, it may have without disadvantage a low absorption in the blue in addition to the absorption gap in the red, since the intensity of the blue radiation which passes through the layer is so strongly diminished that by exposure to light sources of practical consideration halation cannot occur. If the gaps are too pronounced, they can be covered by one or more further suitable dyestuffs.

For the panchromatic layers used in the art of reproduction in colors in combination with color filters it suffices if there are used for the anti-halation layer dyestuffs which have no absorption gaps corresponding with the absorption gaps of the several filters.

In the case that color is desired in the finished developed and fixed plate or film, dyestuff combinations may be used which in part are not bleached in the developer and in the other liquids used in the treatment of the plate. This would particularly occur in the case of films carrying reversion emulsions in which, as for example in photogravure, a yellow dyeing of the photographic support is advantageously used.

As examples of suitable dyestuff combinations may be mentioned methyl blue (cf. Farbstofftabellen by Dr. Gustav Schultz, Berlin 1923, Nr. 538)—acid magenta (Farbstofftabellen Nr. 524) or manganese dioxide-washing blue (Farbstofftabellen No. 968). Dyestuff combinations which in part are not bleached are, e. g., bismarck brown (Farbstofftabellen No. 283)—methyl blue or aniline blue (Farbstofftabellen Nr. 521)—acid magenta.

As a colloid serving as carrier of the dyestuffs I may use any that is suitable, for example gelatine, cellulose derivatives or resins.

In the accompanying drawing cross sections of photographic materials prepared according to my invention are shown in an enlarged scale.

Fig. 1 shows a film comprising a support formed of two colloid layers and a light-sensitive emulsion layer. In the colloid layer next to the emulsion layer there are incorporated two antihalation dyestuffs decolorized in the developing bath, the absorption maximum of one of the dyestuffs covering the absorption gap of the other. Fig. 2 shows the same arrangement of support and light-sensitive emulsion layer, but each of the dyestuffs is distributed in a different colloid layer. Fig. 3 shows an arrangement where the laminated support carrying the emulsion layer consists of three colloid layers. The two colloid layers remote from the light-sensitive emulsion layer contain each a dyestuff of which the dyestuff distributed in the middle colloid layer is not soluble in the developing and fixing bath and the dyestuff in the outer colloid layer is removable in the developing bath.

I claim:

1. Halation proof photographic materials comprising a layer of light sensitive silver halid emulsion and a laminated support containing distributed in at least one of its layers a plurality of dyes, at least one of the absorption maxima of said dyes corresponding to at least one of the absorption minima of at least one of the other dyes, and at least one of the said dyes being removable in the developing baths.

2. Halation proof photographic materials comprising a layer of light sensitive silver halid emulsion and a laminated support therefor, said support containing distributed in at least one of its layers a plurality of dyes in which at least the largest light absorption minimum of one corresponds to an absorption maximum of another, at least one of said dyes being removable in the usual developing baths.

3. Halation proof photographic materials comprising a layer of panchromatically sensitized silver halid emulsion and a laminated support therefor said support containing distributed in at least one of its layers a plurality of dyes in which at least the largest light absorption minimum of one corresponds to an absorption maximum of another, at least one of the said dyes being removable in the usual developing baths.

4. Halation proof photographic materials comprising a layer of light sensitive silver halid emulsion and a laminated support therefor, said support containing, distributed in at least one of its layers two dyes the light absorption maxima of one of which correspond to light absorption minima of the other, at least one of the said dyes being removable in the usual developing baths.

5. Halation proof photographic materials comprising a layer of light sensitive silver halid emulsion and a laminated support therefor, said support containing distributed in at least one of its layers two dyes, the light absorption maxima of one of which corresponds to the light absorption minima of the other, both dyes being removable in the usual developing baths.

6. Halation proof photographic film comprising a layer of panchromatically sensitized silver halid emulsion and in a laminated support a layer of gelatine containing methyl blue and acid magenta which are removable in the usual developing baths.

KONRAD HEBBEL.